United States Patent [19]

Steger

[11] 4,332,397
[45] Jun. 1, 1982

[54] STEERABLE SUSPENSION STRUT WITH PNEUMATIC SPRING

[75] Inventor: Charles B. Steger, Warren, Mich.

[73] Assignee: General Motors Corporation, Detroit, Mich.

[21] Appl. No.: 166,564

[22] Filed: Jul. 7, 1980

[51] Int. Cl.³ .............................................. B60G 15/12
[52] U.S. Cl. ..................................... 280/693; 280/672; 280/674; 267/15 A
[58] Field of Search ............... 280/672, 674, 663, 691, 280/693, 668, 692; 267/15 A

[56] References Cited

U.S. PATENT DOCUMENTS

| | | | |
|---|---|---|---|
| 2,922,635 | 1/1960 | De Lorean | 267/15 A |
| 2,980,441 | 4/1961 | Timpner et al. | 280/693 |
| 3,037,787 | 6/1962 | Gottschald | 280/668 |
| 4,210,343 | 7/1980 | Shiomi et al. | 280/692 |

*Primary Examiner*—Robert R. Song
*Attorney, Agent, or Firm*—Charles R. White

[57] ABSTRACT

A MacPherson type suspension strut in which an air suspension spring boot mounted on a steerable strut housing connects into a boot end cap in turn rigidly secured to the piston rod of the strut shock absorber adjacent the upper end thereof. The piston rod is pivoted to an upper mount so that the piston rod turns with the strut housing on steering input. The pneumatic seal between the boot end cup and piston rod is therefore static for improved sealing performance and service life.

3 Claims, 1 Drawing Figure

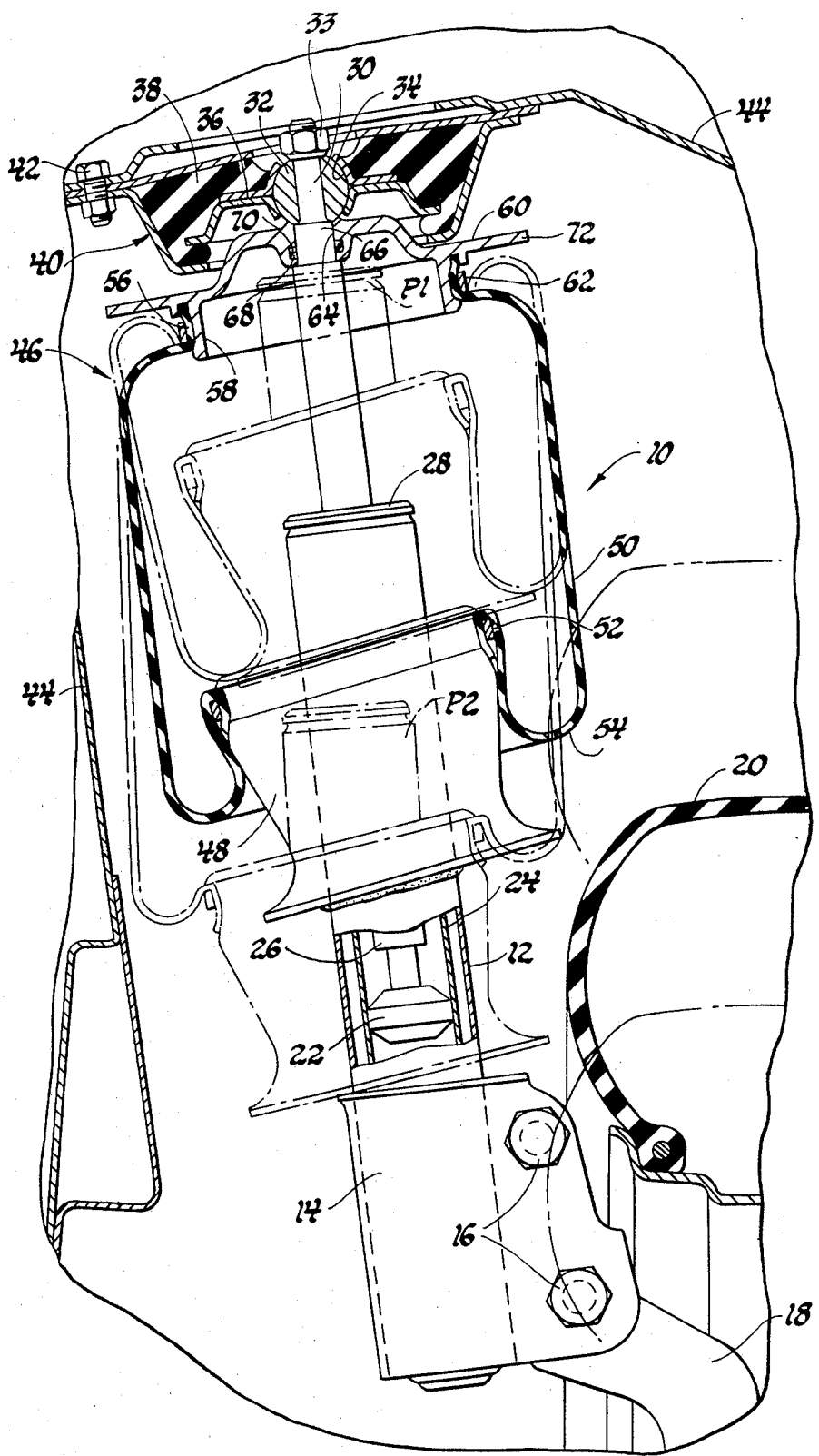

STEERABLE SUSPENSION STRUT WITH PNEUMATIC SPRING

This invention relates to vehicle suspensions and more particularly to a steerable suspension strut incorporating a new and improved air spring with static sealing between the spring and strut components.

In many prior front suspension strut constructions of the MacPherson type, the outer tubular strut body supports the lower end of a helical suspension spring while the upper end engages a seat carried on a thrust bearing in an upper mount that transmits the spring load to the vehicle body. The shock absorber provision for such struts generally features an oil filled cylinder tube fixed in a reservoir tube which may also function as the strut body. A valved piston mounted for reciprocating movement in the cylinder tube connects to a piston rod that is fixed at its outer end to the upper mount. With such construction, the helical suspension spring turns with the tubular strut body about the fixed piston rod when the vehicle is steered. To improve such vehicle suspensions, air springs are sometimes used as a substitute for the helical suspension springs. Generally, such air springs have been of the rolling lobe type into which a predetermined quantity of air has been supplied. While the prior air spring strut designs have provided for effective steering and improved vehicle ride, suspension performance has been impaired by leakage from the dynamic air sealing points which before this invention occurred between the air spring and the supporting strut components.

This invention solves the prior sealing problems resulting from the use of an air spring on steerable suspension struts. In the preferred embodiment, a front suspension strut incorporates a double acting shock absorber for dampening ride motions while providing for a new and improved air spring suspension which features static seals between the air spring and supporting strut components. In this invention the shock absorber rod is attached to the upper mount by a new and improved pivotal connection which allows the shock absorber rod to be turned with the outer tubular housing as steering inputs are imparted to the dirigible wheels of the vehicle. An air spring piston is attached to the outer tubular housing of the strut and the lower end of an air spring boot is attached to the air spring piston in an air tight manner. The boot preferably is of the rolling lobe type and extends from the rolling lobe, peripherally disposed on the piston, upwardly to a reduced diameter collar that fits onto a boot end cap. The boot end cap provides the top of the air spring and is formed with a central opening that accommodates the piston rod extending therethrough. An O-ring mounted in a groove in the boot end cap encircling the central opening provides a static pneumatic seal between the piston rod and the boot end cap. With this construction the boot end cap provides the upper end of the air spring and turns with the air spring boot, the piston rod and the outer cylinder of the strut when the strut is turned during vehicle steering. With this static seal construction, seal wear and accompanying air leakage are reduced so that performance and service life are optimized.

An object of this invention is to provide a new and improved steerable suspension strut for a vehicle in which a static seal is provided between a shock absorber piston rod pivotally attached to vehicle body work and the upper end of a suspension air spring supported on an outer pivotal tube of the suspension strut.

Another object of this invention is to provide a new and improved steerable suspension strut having a pneumatic suspension spring which incorporates a static seal between a shock absorber piston rod and an outer cap member of the suspension so that the seal wear is accordingly minimized and service life is optimized.

Another feature of this invention is to provide a new and improved upper mount for a MacPherson type suspension strut that permits the strut, the shock absorber components supported thereby, and the associated air suspension spring to be turned together so that the air spring suspension and seal service life will be optimized.

These and other features, objects and advantages of this invention will be more apparent from the following detailed description and drawing in which:

The FIGURE is a frontal view partially in section of a MacPherson type strut operatively mounting a steerable road wheel to body work of a vehicle.

Referring now in greater detail to the drawing, the FIGURE shows an independent suspension strut 10 for a vehicle having an outer cylindrical reservoir tube 12 mounted in a cup-like retainer 14 that is connected by threaded fasteners 16 to a wheel steering knuckle 18 to which is rotatably mounted a pneumatic road wheel 20. The lower end of the wheel steering knuckle pivots on a ball stud, not illustrated, for wheel turning. A conventional steering gear operatively connects to the wheel steering knuckle and when actuated by the vehicle operator turns the wheel steering knuckle and thereby the road wheel 20, retainer 14, reservoir tube 12, and the other components of the strut 10. The strut incorporates a valved piston 22 mounted for reciprocating movement in an oil filled cylinder tube 24 such as disclosed in co-pending application Ser. No. 94,691 filed Nov. 16, 1979, hereby incorporated by reference. Extending upwardly from the piston 22 is a cylindrical piston rod 26 that projects outwardly through an upper cap 28 hydraulically closing the upper end of the reservoir tube 12. The piston rod has a reduced diameter upper end portion 30 that extends diammetrically through a ball pivot 32. Nut 33 threaded onto the end of the piston rod secures the piston rod to the ball pivot which is pivotally received in a corresponding spherical socket 34 of a two-piece upper connector plate assembly 36 fitted in elastomer isolator cushion 38 of an upper mount 40. The upper mount 40 is secured to the body work of the vehicle preferably by threaded fasteners 42 and preferably to the upper interior portion of a sheet metal tower 44 formed in the wheel well of the associated vehicle.

To provide spring suspension of the vehicle body with respect to the road wheel, an air spring assembly 46 is provided. This air spring assembly includes a profiled air spring piston 48, generally bell shaped, which is suitably secured in an air tight manner to the reservoir tube 12 of the strut 10. A cylindrical boot 50 that may be of a reinforced elastomer material has its lower end secured air tight by annular band 52 to the upper portion of the air spring piston. From band 52 the boot extends downwardly to form a rolling lobe 54 that moves over the profiled outer surface of the air spring piston. From the reversely curved rolling lobe, the boot extends upwardly, surrounding the upper portion of the mount, to an upper end formed by an annular reduced diameter collar portion 56 which slips over the cylindrical downwardly extending rim 58 of a boot end cap 60. An annular band 62 secures the collar portion of the boot to the end cap 60 in an air tight manner. The boot end cap 60 has a central opening 64 that receives a reduced diameter portion 66 of the piston rod 26 immediately below the spherical ball 32. This piston rod portion 66 is, however, of a diameter larger than that of piston rod portion 30 so that its upper end forms a seat for the ball 32. A nut 33 is threaded tightly on the end of the piston rod so that the ball 32 urges the boot end cap into fixed engagement with the larger diameter portion of the piston rod. With this arrangement, the piston rod turns with the boot end cap and boot. An elastomeric O-ring seal 68 mounted in an internal annular groove 70 formed in the boot end cap 60 around opening 64 contacts the cylindrical exterior surface of the reduced diameter portion 66 of the piston rod to provide static, air-tight seal.

The boot end cap 60 has an annular peripheral portion 72 that extends radially outwardly to provide a spring stop for the upper end of the air spring boot. The interior of the boot is charged with pressurized air in any suitable manner to provide an air spring effective to suspend the vehicle body with respect to the road wheel.

The rolling lobe air spring provides the suspension spring for the vehicle body while the shock absorber component contained in strut 10 dampens the spring motion to provide a smooth and comfortable vehicle ride. The full line position of the strut and air spring shows these components at their design height. The upper phantom line position P1 represents the suspension in full jounce while the lower phantom line position P2 is the full rebound position. Pressure air can be selectively supplied or exhausted from the air spring through suitable valving, not shown, to adjust vehicle height for bumper height maintenance, headlight aiming, or vehicle leveling purposes if desired.

With this invention, steering input into the steering wheel knuckle to steer the road wheel will also turn the retainer 14 and the attached strut components including the air spring piston and boot 50 since the spherical ball 32 and socket 34 cooperate to form a universal pivot joint so that the piston rod turns with these components. With relative movement between the piston rod and the boot end cap eliminated, the O-ring seal 68 is a static seal and is not subject to frictional wear as would be the case with prior art strut air spring constructions. This invention further accommodates the angular motions, not illustrated, of the suspension travel and reduces side loading on the shock absorber components. Accordingly, this new construction provides for improved sealing of the air spring, reduced leakage, improved performance, and optimized service life.

While a preferred embodiment of this invention has been shown and described for illustration purposes, other embodiments will now become apparent to those skilled in the art. Accordingly, the scope of this invention is set forth in the following claims.

The embodiments of the invention in which an exclusive property or privilege is claimed are defined as follows:

1. A suspension strut for steerably mounting a road wheel assembly to a vehicle body and for pneumatically suspending the body with respect to said road wheel, comprising an elongated tubular support having one end connected to said steerable road wheel assembly and extending upwardly therefrom, shock absorber means operatively mounted in said support including an oil filled cylinder tube operatively mounted in said support, a piston mounted for reciprocal movement in said cylinder tube having a piston rod extending upwardly therefrom, an upper cap member through which said piston rod slidably extends for closing said tubular support, a boot end cap secured to said piston rod adjacent the upper end thereof, a pneumatic spring including a tubular flexible boot, mounting means for securing the lower end of said boot to said tubular support, said boot extending from said mounting means, a boot end cap having an opening through which said piston rod extends, static fluid seal means operatively mounted by said boot end cap and disposed around said piston rod to provide an air-tight seal for said pneumatic spring, an upper mount including universal ball joint means with a ball mounted on said piston rod above said boot end cap for pivotably mounting said piston rod to said vehicle body to permit said piston rod to turn with said pneumatic spring when said steerable road wheel assembly is turned and nut means threaded onto the upper end of said piston rod means and above said ball joint means to secure said ball of said ball joint means and said boot end cap to said piston rod.

2. A suspension strut for steerably mounting a road wheel assembly to a vehicle body and for pneumatically suspending the body with respect to said road wheel, comprising an elongated tubular support having one end connected to said steerable road wheel assembly and extending upwardly therefrom, shock absorber means operatively mounted in said support including an oil filled cylinder tube operatively mounted in said support, a piston mounted for reciprocal movement in said cylinder tube having a piston rod extending upwardly therefrom, an upper cap member through which said piston rod slidably extends for closing said tubular support, a boot end cap rigidly secured to said piston rod adjacent the upper end thereof, a pneumatic spring including a tubular boot of reinforced elastomer material, piston means for securing the lower end of said boot to said tubular support, said boot extending upwardly from said piston means, a boot end cap having an opening through which said piston rod extends, fluid seal means operatively mounted by said boot end cap and disposed around said piston rod to provide a static air-tight seal for said pneumatic spring, an upper mount including universal pivot joint means with a ball contacting an upper portion of said boot end cap and universally pivotally mounting said piston rod to said vehicle body to permit said piston rod to turn with said pneumatic spring when said steerable road wheel assembly is turned and threaded fastener means for securing part of said pivot joint means to said piston rod and said boot end cap means.

3. A suspension strut for steerably mounting a road wheel assembly to a vehicle and for pneumatically suspending a body of the vehicle to said road wheel assembly comprising an elongated tubular support casing having one end connected to said road wheel assembly and extending upwardly therefrom, shock absorber means operatively mounted in said support casing, said shock absorber means including a motion damping piston operatively mounted in said casing, said piston having a rod extending from said casing, an upper cap member seated on said rod, a pneumatic spring having a lower end operatively connected to said casing and having an upper end connected to said cap, static fluid seal means operatively mounted between said cap member and said piston rod, an upper body mount including ball and socket means connecting the end of said piston rod to said body of the vehicle for universal movement with respect thereto to accommodate pivot motions of said rod during jounce and rebound so that said piston rod turns with said casing and said cap member and said seal therein in response to steering moment applied to said wheel assembly, and nut means threaded on said piston rod for securing said ball of said ball and socket means to said piston rod and simultaneously securing said cap member to said piston rod.

* * * * *